United States Patent
Kokufuda

[11] Patent Number: 5,837,329
[45] Date of Patent: Nov. 17, 1998

[54] METHOD FOR MACHINING ROLLERS AND OTHER OBJECTS USING LASER LIGHT AND EQUIPMENT FOR MACHINING

[75] Inventor: Kyoji Kokufuda, Tokyo, Japan

[73] Assignee: Shinozaki Manufacturing Co., Ltd., Tokyo, Japan

[21] Appl. No.: 700,417

[22] PCT Filed: Dec. 21, 1995

[86] PCT No.: PCT/JP95/02626

§ 371 Date: Aug. 26, 1996

§ 102(e) Date: Aug. 26, 1996

[87] PCT Pub. No.: WO96/20435

PCT Pub. Date: Jul. 4, 1996

[30] Foreign Application Priority Data

Dec. 28, 1994 [JP] Japan ................................. 6-337772

[51] Int. Cl.⁶ ........................... B05D 3/00; C08J 7/18
[52] U.S. Cl. ................. 427/555; 118/35; 118/56; 118/70; 118/500; 427/140; 427/271; 427/372.2; 427/444; 427/554; 427/596
[58] Field of Search ............................. 427/555, 596, 427/140, 271, 444, 372.2, 554; 118/35, 56, 500, 70

[56] References Cited

FOREIGN PATENT DOCUMENTS

| | | |
|---|---|---|
| A-SHO-58-179586 | 10/1983 | Japan . |
| A-SHO-59-73189 | 4/1984 | Japan . |
| A-SHO-59-153591 | 9/1984 | Japan . |
| A-HEI-1-95814 | 4/1989 | Japan . |
| A-HEI-3-144458 | 6/1991 | Japan . |
| A-HEI-5-34934 | 2/1993 | Japan . |
| A-HEI-5-337660 | 12/1993 | Japan . |
| A-HEI-6-344160 | 12/1994 | Japan . |

*Primary Examiner*—Bernard Pianalto
*Attorney, Agent, or Firm*—Griffin, Butler, Whisenhunt & Szipl, LLP

[57] ABSTRACT

By irradiating with high-intensity pulsed laser light of wavelength 9.0µ to 11.0µ the organic film on rollers, and specifically, the film on photosensitive drums, fixing rollers, rubber rollers, and magnetic rollers used in photocopying equipment, printers, facsimile machines, and other equipment, said film can be removed from the roller surface without damaging the underlying metal layer in any way. Metal cylinders from which film has been removed by this method can either be reused as is, or may be recoated, and then, reused as rollers in photocopying equipment, printers, and facsimile machines.

Furthermore, a method is disclosed, wherein laser light irradiation is used to remove film from the surface of various rollers, as is equipment for roller machining and processing.

36 Claims, 4 Drawing Sheets

METHOD FOR MACHINING ROLLERS AND OTHER OBJECTS USING LASER LIGHT AND EQUIPMENT FOR MACHINING

FIELD OF THE TECHNOLOGY

The present invention relates to a method for removal of organic thin film from a roller, and equipment for implementing this method. Specifically, the present invention relates to a method and equipment which use laser light to effectively remove organic film from the photosensitive drums used in photocopy machines, printers and facsimile equipment, fixing rollers, rubber rollers, magnetic rollers, and various other types of rollers. It further relates to a method and the necessary equipment to use laser light to process defective products generated in the process of roller manufacture, as well as various types of used rollers, enabling reuse of said rollers.

BACKGROUND OF THE INVENTION

Rollers are used in a variety of machines and devices. For instance, photosensitive drums, fixing rollers, rubber rollers, and magnetic rollers are used in photocopy machines, printers, facsimile machines, and other equipment. In general, such rollers are either cylinders with a high degree of concentricity formed of aluminum or some other metal, or else a similar metal cylinder, the surface of which has been treated in various methods and covered with a film. Fixing rollers often consist of aluminum cylinders with a fluoride resin coating; similarly, rubber rollers are often aluminum cylinders with a rubber coating. Photosensitive drums generally consist of a cylinder of aluminum or some other metal, to which an undercoating is applied, followed by coating with a layer containing titanium oxide or some similar material, a polycarbonate resin layer, and a film. Magnetic rollers are used to supply toner; often a metal cylinder is used without further modification.

The following problems with these rollers have been identified, relating to roller manufacturing and use:

(1) When forming the film on the metal cylinder surface, the metal cylinder is immersed in a container of liquid from which a film is to be formed, and said metal cylinder is then pulled upward. At this time, the bottom part of the immersed cylinder is completely covered, but the upper part remains uncovered. For this reason, the roller is unbalanced. It therefore becomes necessary to remove part of the film on the bottom, in order to finish the roller so that it is balanced.

(2) When magnetic rollers used for toner supply are used for long periods of time, styrene resins and other toner components tend to adhere to the roller surface and accumulate, so that an undesirable film is formed. Such an undesirable film on the magnetic roller adversely affects the magnetic and electrical properties of the toner, and degrades the quality of the resulting image.

(3) When rollers are used for extended periods of time, the film on the roller surface may receive damage in a non-uniform manner, or foreign matter may adhere to its surface. As a result, multiple sheets of paper for recording may be fed into the mechanism, the quality of photocopies may be deteriorated, or other problems may occur. Rollers which give rise to such problems during equipment use must be replaced, and in general, rollers which have been replaced cannot be refurbished and, therefore, are discarded. Because the number of rollers which are thus discarded is very large, a means for recovery and refurbishing of the rollers is desired.

(4) In the process of manufacturing various rollers, such as photosensitive drums, fixing rollers, and rubber rollers which are used in photocopiers, printers and facsimile machines, defective products occur as a consequence of film formation processes. The rate of occurrence of such defective items is said to be at least 10%, and because it is not easy to recover and reuse such defective rollers, they are discarded. In conjunction with rollers discarded after replacement as described in (3) above, this represents a considerable waste of resources, and an appropriate means of roller reuse is sought.

(5) When forming a film on the surface of a roller during roller manufacturing, the film thickness may be non-uniform, or the film surface may be irregular, or pinholes may be present in the film.

Measures currently adopted to resolve the above problems, and the status surrounding such measures, are as follows.

With regard to problem (1), the excess film at the bottom of the cylinder is either scraped away using a hair brush or other instrument, or is removed by chemical etching, followed by wiping using a solvent. These methods take time and also use chemical reagents, such that post-treatment becomes complicated. As a result, a dry process which does not rely on chemical means is strongly desired. Furthermore, the processing methods currently in use are expensive. In light of these disadvantages, a method for effective removal of excess film at the bottom of cylinders is sought.

With respect to problem (2), no appropriate processing method is available, and such rollers are discarded. That is, at present no appropriate method exists for removing the film formed by the adhesion and accumulation of toner components and other materials, such that magnetic rollers are replaced with new rollers, and the old rollers are discarded. This is a waste of resources, and some means of reclaiming and recycling such rollers is desired.

With respect to problems (3) and (4), there are, as in the case of (2) above, no appropriate countermeasures available, and the rollers are discarded. This too is a waste of resources, and a means of reusing rollers is desired. With respect to problem (5), tape polishing is used in some cases. That is, protrusions are polished in order to make the surface smooth. However, such tape polishing may leave "abrasion marks" in the roller film, such that heat treatment is necessary after polishing, introducing yet another process and raising costs. For this reason, tape polishing is used only in some cases, and most defective products are discarded. Consequently, there is an urgent demand for an effective means of obtaining film with uniform thickness.

SUMMARY OF THE INVENTION

The objectives of the present invention include resolution of problems relating to organic films on rollers, and specifically, resolution of the problems described above relating to the photosensitive drums, fixing rollers, rubber rollers, magnetic rollers, and other rollers used in photocopy equipment, printers, facsimile machines, and other equipment, enabling effective reclamation of said rollers, as well as equipment for the implementation of this method. Further objectives of the present invention are methods and equipment for the effective processing of defective products arising in the process of roller manufacturing and of rollers which through prolonged use are no longer adequate for use, to enable reuse of said rollers.

Of the above-described problems, problems (1) through (4) involve how to remove film on the roller surface. That is, it is sufficient to be able to effectively remove film on the roller surface. In the case of magnetic rollers, the roller can be reused without further treatment once the film is removed; in the case of rollers which are used after forming a film on the surface, the film can first be removed and then another film formed. In the case of problem (5), on the other hand, a method is sought for effectively smoothing and producing uniform films on a roller surface, to replace tape polishing.

From an engineering standpoint, the problems faced by the present invention may be reduced to the problems of a method for effective removal of films from roller surfaces, and of equipment to implement that method. The films to be removed by the present invention are organic films on roller surfaces, such as films of fluoride resins, polystyrene-base resins used as components in toners, polycarbonates, and rubbers.

The inventors of the present invention conducted extensive research on methods and equipment for effective removal of films on roller surfaces, and discovered that when a specific type of laser light is used, said films can be removed effectively. Based on this discovery, they completed the present invention.

In removing part or all of the film from various rollers, and specifically from photosensitive drums, fixing rollers, rubber rollers, magnetic rollers, and other rollers, such as those used in photocopiers, printers, and facsimile machines, this method as well as the equipment for removal of films from rollers is characterized by the irradiation of high-intensity pulsed laser light of wavelength 9.0 to 11.0 micron, and in particular, of high-intensity pulsed laser light at a wavelength of 9.3 micron.

The equipment for film removal comprises: first, a roller processing apparatus consisting of a mechanism for holding and rotating various rollers, such as photosensitive drums, fixing rollers, rubber rollers, and magnetic rollers for use in photocopying machines, printers and facsimile equipment; a laser oscillator and laser light irradiation mechanism; an air blower for removal of the soot of film residue and other material generated during laser irradiation; and a suction dust collection mechanism; second, a roller machining apparatus which employs a concave lens to broaden the optical path of the laser light and a cylindrical lens to form the beam into a long, thin rectangular-shaped beam with which the roller is irradiated. Third, a roller processing apparatus, which during laser light irradiation, combines total reflection mirrors and semi-transparent mirrors arranged in stages to break the beam of laser light into multiple beams. Fourth, a roller processing apparatus capable of determining the end of processing, and equipped with either an audio detector to detect the sound emitted during laser irradiation, or with an optical system to observe the state of the roller surface, or with both an audio detector and an optical system.

In the past, there have been almost no methods for effectively removing film from a roller without damaging the underlying metal layer. In general, when attempting to remove films or other materials adhering to a roller surface, mechanical methods of removal are conceivable. These include, for instance, machining, blasting, polishing, and water jet methods. Machining methods involve cutting the film; however in order to completely remove the film, the cutting will inevitably proceed to the metal layer. After one or several such machinings, the metal layer becomes extremely thin, such that strict limits are imposed on the possibility of reuse. In blasting methods where the workpiece to be processed is sprayed with fine abrasive particles, and also in polishing methods, the underlying metal layer is damaged, and therefore, such methods are also unsuitable.

Moreover, in water jet methods, if the water pressure used is low, the film removal is insufficient, whereas if it is too great, the metal cylinder may be cut. Thus, water jet methods are not suitable for effective removal of films of different compositions. In all cases, it is as a practical matter, extremely difficult to effectively remove only the film without damaging the underlying metal layer using mechanical methods.

On the other hand, film dissolution methods in which a solvent is used to dissolve the film are also conceivable. However, it is extremely difficult to select a solvent for use in dissolving films of various compositions. Moreover, even if dissolution were possible, it would be necessary to recover the solvent and complex processes would be involved in roller reclamation, making such methods impractical.

In contrast, irradiation with high-intensity pulsed laser light in the 9.0 to 11.0 micron wavelength range enables easy removal of films from roller surfaces, and is a dry process. It therefore offers significant advantages.

Laser light has a high intrinsic energy density, and the direction and duration of laser light emission can be controlled electrically. Furthermore, by combining a laser with a mask module, expander or other optical system, the shape of the laser-irradiated area can be arbitrarily set. Moreover, laser light does not make physical contact with the workpiece, and the process of machining using laser light is a dry process, such that the laser light method offers the advantage of ease in handling compared with chemical and mechanical methods. For this reason laser light machining is suitable for industrial applications.

The use of laser light to remove films is itself already known in the prior art. For instance, the removal by laser light of metal, metal oxide, or other inorganic materials is described in Laid-Open Patents 58-179586, 59-73189, 59-153591, 1-95814, and 5-337660, etc. Techniques to use laser light to remove organic films from various rollers, such as the photosensitive drums, fixing rollers, and magnetic rollers used in photocopying equipment, printers, and facsimile machines are described in Laid-Open Patents 3-144458, 5-34934, and 6-344160. These techniques employ YAG lasers and carbon dioxide gas lasers, and in particular, continuous carbon dioxide gas lasers, as sources of laser light.

Lasers which are known as practical sources of high output include carbon dioxide gas lasers, excimer lasers, and YAG lasers (InterLingua Note - Sic. Listed in exact order as mentioned in the original). Among these, YAG lasers have the disadvantage of causing some melting of the metal layer which constitutes the roller substrate. Excimer lasers are not able to remove fluoride resin films. Finally, continuous carbon dioxide laser light has the disadvantage of poor machining efficiency. Pulsed laser light in the 9.0 to 11.0 micron wavelength range can efficiently remove films from roller surfaces, and therefore, the present invention uses high-intensity pulsed laser light in the 9.0 to 11.0 micron wavelength range.

The laser oscillator is inherently a pulsed device; however the desire to use continuous laser light has led to widespread use of continuous-wave-type lasers. On the other hand, some lasers are not able to produce continuous-wave output due to the mechanism of excitation. In such cases, the intensity of the emitted laser light is great, and the output is a high-intensity pulsed laser light.

In the present invention, high-intensity pulsed laser light in the wavelength range from 9.0 to 11.0 micron is used. Actual examples of laser light used in the present invention are high-intensity pulsed laser light at a wavelength of 9.3 micron, and high-intensity pulsed laser light at a wavelength of 10.6 micron. These kinds of high-intensity pulsed laser light can be obtained, for instance, from a laser emission device ("Impact Laser") manufactured by Sumitomo Heavy Industries, Ltd. The laser light emitted by this "Impact Laser" is a pulsed laser light and has a high emission intensity.

Normally 9.3 micron wavelength high-intensity laser light is obtained from the "Impact Laser." By changing the coating material of the front mirror and rear mirror of the laser oscillator, however, the wavelength of the light emitted by the oscillator can be varied in the range of 9.0 to 11.0 micron.

By using high-intensity pulsed laser light at wavelengths between 9.0 and 11.0 micron, organic films on various types of rollers can be removed effectively. By using said laser light, it has become possible to effectively remove films from various types of rollers. Through the present invention, accurate film removal from rollers becomes possible and in a short period of time, and the economic benefits arising from the present invention are very significant.

Continuous laser light from carbon dioxide gas lasers, which are normally capable of high output, suffers from the disadvantage of a tendency for the film to be "scorched" or "burned." For instance, when irradiating a photosensitive drum with continuous-wave carbon dioxide gas laser light, the film may peel in places, and smoke and burns may occur, making the process unsuitable for the purpose of drum refurbishing and reuse. With respect to energy efficiency as well, when using a continuous-wave carbon dioxide gas laser, 6 kW of power is required to obtain an operating efficiency equivalent to that of 400 W of power using high-intensity pulsed laser light.

When removing organic film from a roller surface, high-intensity pulsed laser light at a wavelength between 9.0 and 11.0 micron is effective. This is inferred to be due to both, the fact that a large amount of energy is delivered in a brief instant because high-intensity pulsed laser light is used, and the fact that laser light in the wavelength range from 9.3 to 11.0 micron is efficiently absorbed by organic films.

When using laser light for processing, the workpiece must be efficiently irradiated by the laser light. To this end, in addition to the obvious measure of using several sources of laser light, it is also effective to use either a method in which the laser light emitted by a laser light source is diffused using a concave lens, and then formed into a more rectangular beam using a cylindrical lens, or else a method for separating the laser light into multiple beams using an optical system consisting of semi-transparent mirrors and total reflection mirrors arranged in stages, in order to uniformly irradiate the entire roller surface in the roller length direction with laser light, or else a combination of the above methods.

Moreover, by rotating the roller to be processed while irradiating it with laser light, the laser light can be efficiently irradiated on the roller surface.

Figure 1:
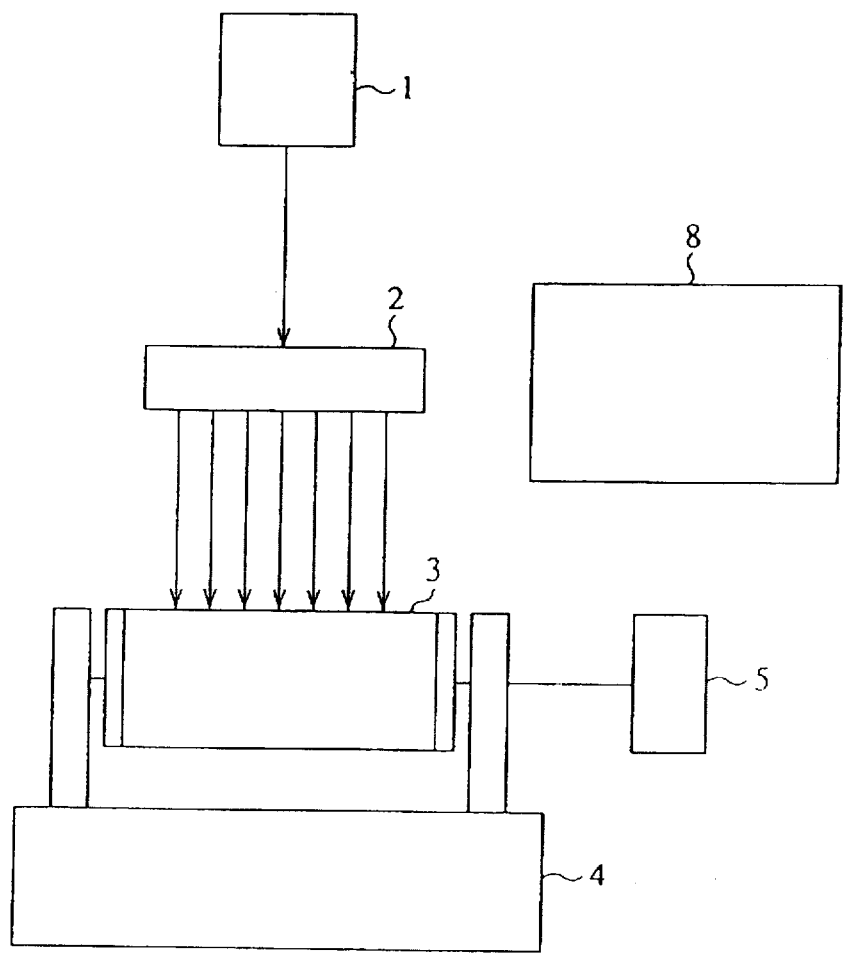
FIG. 1 shows a block diagram of the basic construction of the equipment for film removal according to the present invention.

REFERENCE NUMBERS 1, 1a, 1b Laser light oscillators
2 Laser light irradiation device
3 Roller
4 Roller retention and rotation mechanism
5 Driving apparatus
6 Blower mechanism
7 Gas generator
8 Suction dust collection mechanism
9 System controller
10a, 10b Laser controllers
11 Audio sensor
12 Audio detector
13 CCD camera
14 Monitor
15 Image processing unit
16a to 16d Total reflection mirrors
17a, 17d, 18a, 18c, 18f, 18h Semi-transparent mirrors
17b, 17c, 18b, 18d, 18e, 18g Total reflection mirrors
19a to 19h Concave lenses
20a to 20h Cylindrical lenses

PREFERRED EMBODIMENTS OF THE INVENTION

One embodiment of the present invention is as follows. The basic configuration of equipment for film removal comprises a retention and rotation mechanism for holding and rotating the various rollers used in photocopying equipment and other equipment, a mechanism for laser light generation and irradiation, and a blower mechanism and suction dust collection mechanism for removing soot and the film residue arising during laser light irradiation.

In FIG. 1, 1 is a laser oscillator. Laser light emitted by the laser oscillator is used to irradiate a roller 3 by the laser light irradiation device 2. Said roller 3 is loaded into a roller retention and rotation mechanism 4, and is rotated by a driving apparatus 5. In order to remove the soot and film residue, which is generated during laser light irradiation of the film on the roller surface, gas is blown by a gas blower mechanism 6. Said gas is supplied by a gas generator 7. It is convenient to supply gas using either compressed air or a gas tank. Said gas used may be ordinary air, however the use of argon, helium, nitrogen, or some other inert gas is desirable.

When irradiating a roller with laser light, in general, a suction dust collector 8 is installed; in the present invention, also, a suction dust collector can be used to remove soot, film residue, and other material, however additional use of a gas blower is effective.

Figure 4B:
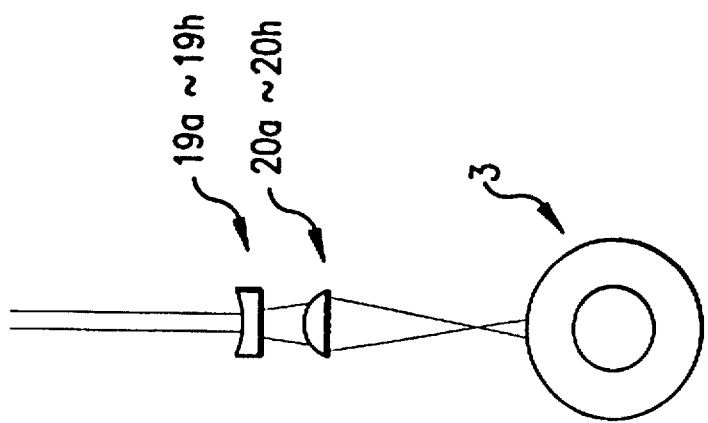
FIG. 4 shows a block diagram of the lens unit of the laser light irradiation system according to the present invention.
Figure 4A:
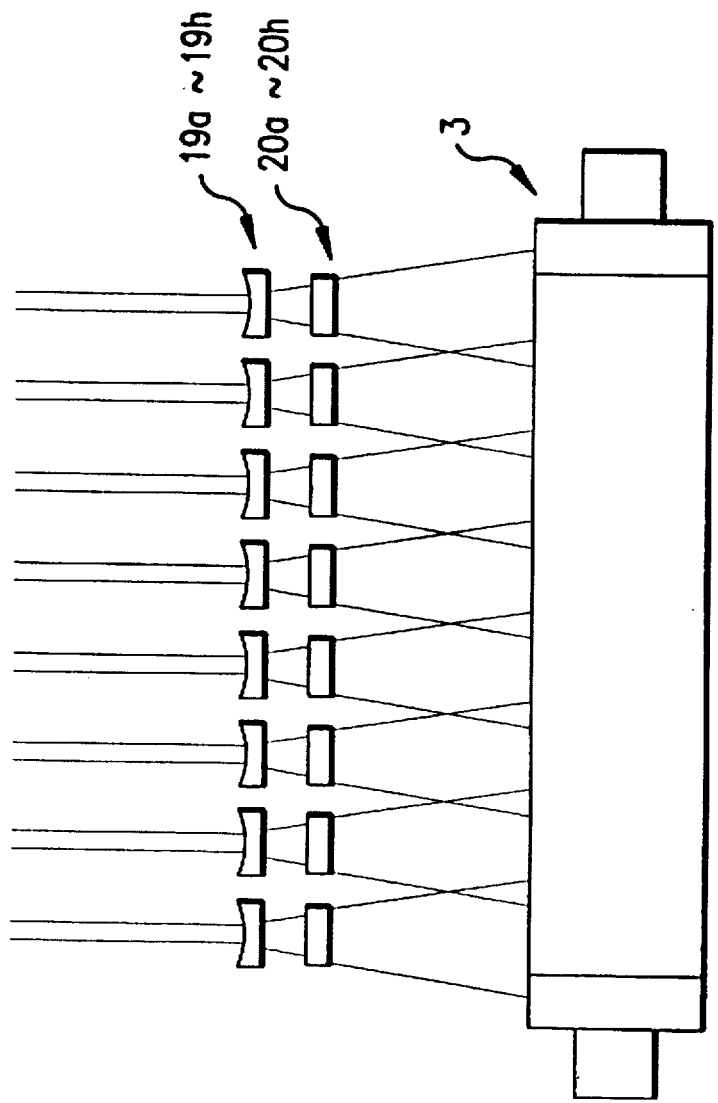

When irradiating the roller with laser light, the emitted laser light is diffused by a concave lens, formed into a rectangular beam by a cylindrical lens, and irradiated on the roller surface. That is, the laser light beam in FIG. 4 is broadened by the concave lens 19. The broadened laser light beam is next guided to the cylindrical lens 20, where it is converted into a long, narrow rectangular-shaped beam of laser light. This rectangular beam of laser light is then irradiated on the object to be irradiated, namely, roller 3. Here, the width and length of the laser light beam irradiated on the roller can be adjusted by changing the distance between the laser irradiation device and the roller.

Figure 3:
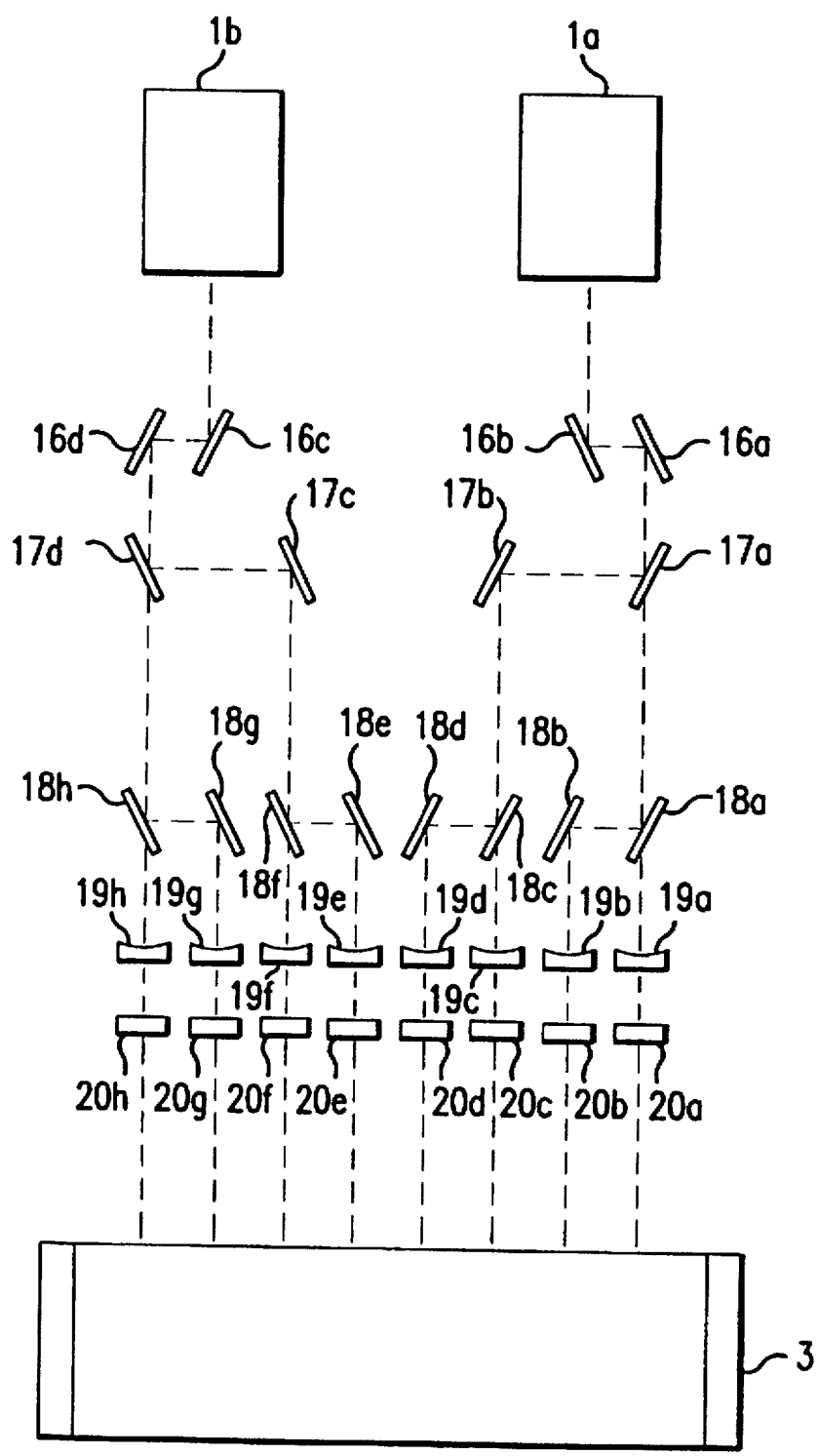
FIG. 3 shows a block diagram which illustrates by example, the laser light irradiation system of the film removal apparatus according to the present invention.

When processing long rollers in particular, the laser light may be divided into multiple beams in order that the entire roller surface can be irradiated uniformly in the length direction. The following is an example of an example of such a system, with reference to FIG. 3. In this explanation, the laser light is divided into eight laser light beams, however in other embodiments, any other number of beams may be used. Laser light emitted by the laser oscillator 1a is guided to the total reflection mirrors, 16a and 16b. The laser light further passes through the semi-transparent mirror 17a, which transmits 50% of the light and reflects 50%; the transmitted light is guided to the semi-transparent mirror 18a, and the reflected light to the total reflection mirror 17b. Of the laser light guided to the semi-transparent mirror 18a, 50% is transmitted and passes through lenses, 19a and 20a, before reaching roller 3. The other 50% is reflected and guided to the total reflection mirror 18b, then passes through the lenses 19b and 20b before reaching the roller 3.

Thus, by using an optical system combining multiple stages of semi-transparent mirrors and total reflection mirrors, the laser light may be divided into fourths and guided to the lenses, 19a and 20a, to, 19d and 20d. The laser light emitted by the laser light oscillator 1b is divided into fourths by a similar process to reach the lenses, 19e and 20e, to, 19h and 20h, such that a total of eight laser light beams are obtained.

The method for holding or retaining the roller may employ either a horizontal roller orientation as shown in the example, or a vertical orientation. In this case, of course, laser light irradiation occurs from a horizontal direction.

As part of the laser light irradiation process, the method of dividing the laser light into several beams has been described, however the present invention is not limited to this method. A roller may also be irradiated with a single beam of laser light. In this case, the laser light will be irradiated on only some parts of the roller, and therefore, it is desirable that, while rotating the roller, the roller either be moved laterally, or else the laser light be moved laterally in the roller direction of the length. Of course, the method of moving the laser light in the roller direction of the length can also be applied to the aforementioned case in which the laser light is divided into multiple beams.

Automated execution of the film removal process is also possible. Here, an important issue is the method used to determine the end of the process of film removal. It is known that when irradiating a roller with laser light, the sound emitted during laser light irradiation becomes smaller as the film is removed, and the area of the underlying metal layer becomes greater. This phenomenon may be utilized to detect the sound emitted during laser light irradiation, using it as a signal to determine the end of the removal process.

In addition, a camera may be used to determine the state of the roller surface as an image, and computer image processing may be used to decide whether the film has been removed or not. By using image processing to cause the metal layer to appear white and the film areas to appear black, the completion of the film removal process may be determined easily and reliably. Either of these two methods may be used independently, or the two may be used in combination.

Figure 2:
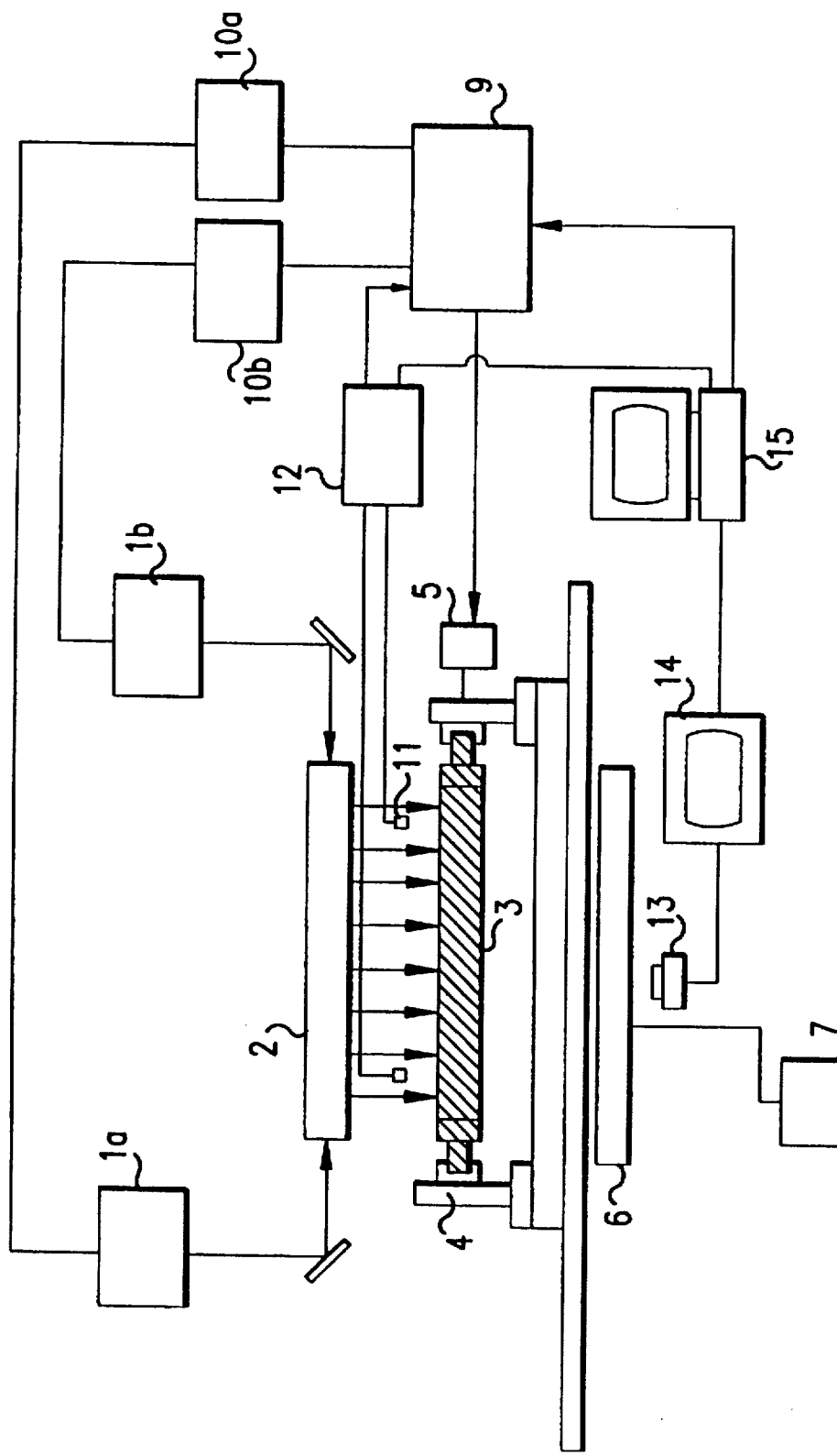
FIG. 2 shows a block diagram of an embodiment of film removal apparatus according to the present invention.

In FIG. 2, the sound emitted during laser light irradiation is measured by sensor 11 and audio detector 12. In addition, the surface state is captured by a CCD camera 13, and can be observed on a monitor 14. The captured image data is subjected to image processing on a computer 15. The sound is converted into an appropriate electrical signal, and the data resulting from image processing is also converted into electrical signals at an appropriate brightness and transmitted to the system controller 9, such that any necessary measures can be taken to control the lasers, stop the roller rotation, or take other actions.

Because the coating layer on rubber rollers is thicker than the covering on other types of rollers, such rollers may be subjected to machining or other preprocessing, to cut the rubber layer in advance, so as to reduce the laser light irradiation time.

One specific embodiment of the present invention is herein explained with reference to FIG. 2. Roller 3 is mounted on a retention and rotation mechanism 4, and said roller is rotated by a rotation apparatus 5. Laser light is emitted from the laser oscillators, 1a and 1b. The irradiation of laser light is controlled by controllers, 10a and 10b. The emitted laser light passes through an optical system comprising total reflection mirrors, semi-transparent mirrors, concave lenses, and cylindrical lenses, before irradiation on roller 3. This optical system is in essence identical to the optical systems described in FIG. 3 and FIG. 4.

When the laser light is irradiated on the roller, the film on the roller surface is gradually removed. The sound emitted during this process is captured by sensor 11 and audio detector 12, becoming an electrical signal which is sent to the system controller 9, which controls the entire system. On the other hand, image processed data corresponding to the surface state of roller 3 is captured by the CCD camera 13 and passes through monitor 14, before being subjected to image processing on computer 15. The image-processed data is sent, as electrical signals corresponding to brightness, to system controller 9. When the signal based on the sound at detector 12 falls below a certain level, it is compared with the brightness signals obtained from camera 13, and the completion of film removal from roller 3 is confirmed, and controller 9 sends signals to stop the laser irradiation and roller rotation, this completing the series of tasks.

The soot, film residue, and other materials generated in the process of film removal is removed by blowing gas using the suction dust collection mechanism 8 and the gas blower mechanism 6. The gas is supplied by a compressor or from a tank 7.

Embodiment 1

A fixing roller comprised of an aluminum cylinder 300 mm in length and 30 mm in diameter and covered with a 12 micron thick Teflon coating was mounted on the roller retention and rotation mechanism 4 in FIG. 2. The driving apparatus 5 was used to rotate the roller at a linear velocity of 2,000 mm/minute. Using the "Impact Laser" laser oscillator manufactured by Sumitomo Heavy Industries, Ltd., 200 W of laser light of wavelength 9.3 micron was emitted from the two emitters, 1a and 1b, and after the light was divided into eight beams, the light was irradiated on the photosensitive drum. The area irradiated by a single beam of laser light was a rectangle 0.1 mm wide and 40 mm in length.

When the laser light was irradiated on the roller, a large crackling sound was emitted, and the film on the roller was observed to be removed gradually. As the film was removed, the emitted sound became smaller. At the same time, the data obtained from image processing of the image data captured by the camera showed clearly that the black area vanished, while the white area expanded, indicating that the film was being removed. Soot and film residue were generated near the roller and these were removed by blowing nitrogen supplied from the tank 7 using the blowing mechanism 6.

When laser light was irradiated for 7 seconds, the emitted sound was reduced and the results of image processing also indicated that the film had been removed. The laser light oscillation and roller rotation were stopped, the roller was removed from the equipment, and on close inspection of the roller surface with the unaided eye and using a magnifying glass, the Teflon film was determined to have been completely removed.

After removing the film in this manner, the roller was recoated and used again in photocopying equipment, and no problems were encountered.

Embodiment 2

An aluminum photosensitive drum 300 mm in length and 80 mm in diameter was mounted on the roller retention and rotation mechanism 4 in FIG. 2, similar to the procedure of Embodiment 1. The driving apparatus 5 was used to rotate said drum at a linear velocity of 400 mm/minute. Using the "Impact Laser" laser oscillator manufactured by Sumitomo Heavy Industries, Ltd., 200 W of laser light of wavelength 9.3 micron was emitted from the two emitters, 1a and 1b, and after the light was divided into eight beams, the light was irradiated on the photosensitive drum. The area irradiated by a single beam of laser light was a rectangle 0.1 mm wide and 40 mm in length.

When the light was irradiated on the drum, a similar crackling sound was generated, and the film on the drum surface was observed to be gradually removed. Because the composition of the film on the photosensitive drum surface differed from that of the film on the fixing roller, the sound generated during laser irradiation was somewhat louder than that generated in the case of the fixing roller. As the film was removed, soot and film residue were generated; these were removed by blowing nitrogen together with suction.

On continuing the laser light irradiation for 18 seconds, the sound became small, and the results of image processing also revealed that the film had been removed. The laser light irradiation and drum rotation were stopped, the drum was removed from the equipment, and on close inspection of the roller surface with the unaided eye and using a magnifying glass, the film was determined to have been completely removed.

After removing the film in this manner, the drum was recoated and used again in photocopying equipment, and no problems were encountered.

Embodiment 3

A rubber roller consisting of an aluminum cylinder 300 mm in length and 45 mm in diameter and coated with 1 mm of rubber was mounted on the roller retention and rotation mechanism 4 in FIG. 2, similar to the procedure of Embodiment 1. The driving apparatus 5 was used to rotate the roller at a linear velocity of 1,000 mm/minute. Using the "Impact Laser," 200 W of high-intensity pulsed laser light of wavelength 10.6 micron was emitted from the two emitters, 1a and 1b, and after the light was divided into eight beams, the light was irradiated on the roller. The area irradiated by a single beam of laser light was a rectangle 0.1 mm wide and 40 mm in length.

When the light was irradiated on the drum, a large sound was generated, and the film on the roller surface was observed to be gradually removed. As the film was removed, the sound became smaller. After the laser irradiation lasted for 25 seconds, the sound became small, and the results of image processing of an image from the camera indicated that there were no black areas and that the film had been removed. Here, soot and film residue were generated near the roller; these were removed by blowing nitrogen.

The laser light irradiation and roller rotation were stopped, the roller was removed from the equipment, and on close inspection of the roller surface with the unaided eye and using a magnifying glass, the rubber film was determined to have been completely removed.

After removing the film in this manner, the roller was recoated with rubber and used again in photocopying equipment, and no problems were encountered.

Embodiment 4

A magnetic roller consisting of an aluminum cylinder 300 mm in length and 25 mm in diameter and coated with a resin film based on polystyrene, was mounted on the roller retention and rotation mechanism 4 in FIG. 2, similar to the procedure of Embodiment 1. The driving apparatus 5 was used to rotate said roller at a linear velocity of 400 mm/minute. High-intensity pulsed laser light of wavelength 9.3 micron was emitted from the two emitters, 1a and 1b, and after the light was divided into eight beams, the light was irradiated on the resin film on the roller. The energy density incident on the roller was 3 J/cm2, the film on the roller surface was observed, and three pulses of laser light were used. It was observed that the laser light was irradiated on the roller to be gradually removed. As the film was removed, soot and film residue were generated near the roller; these were removed by blowing nitrogen.

On close inspection of the surface of the roller with the unaided eye and using a magnifying glass, the resin film was determined to have been completely removed. After removing the film in this manner, the roller was used again in photocopying equipment, and no problems were encountered.

Comparative Example 1

In Embodiment 3, the rubber film on the rubber roller was irradiated with laser light under identical conditions, except that continuous-wave carbon dioxide gas laser light with an output of 4 kW was used. After irradiation for approximately 45 seconds, the rubber was partially removed; however on close inspection of the roller surface after irradiation, burn marks were found on the rubber film.

Field of Industrial Application

By using high-intensity pulsed laser light with a wavelength range from 9.0 to 11.0 micron to irradiate organic films on rollers, and in particular, the films on photosensitive drums, fixing rollers, rubber rollers, magnetic rollers, and other rollers used in photocopying equipment, printers, and facsimile machines, it is possible to remove said film without causing any damage to the underlying metal layer. Metal cylinders which have been subjected to such processing may either be reused, either without further treatment or after recoating, in photocopying equipment, printers, facsimile machines, and other equipment.

I claim:

1. A method for removing a portion of an organic film from the surface of a roller, comprising the step of irradiating the portion of the film to be removed from the roller surface with high-intensity pulsed laser light of a wavelength of 9.0 micron to 11.0 micron;

wherein the step of irradiating further comprises dividing a laser light beam into a plurality of sections with at least one half mirror and at least one full mirror; broadening each section with a concave lens to produce a broadened section, shaping each broadened section to produce a rectangular shaped beam; and irradiating a rotating roller along a longitudinal axis thereof with the elongated rectangular shaped beam to remove the portion of an organic film from the surface of the roller.

2. The method for removing film from rollers according to claim 1, wherein the high-intensity pulsed laser light used to irradiate the roller has a wavelength of 9.3 micron.

3. A method of removing a part of an organic film from a surface of a roller according claim 2, further comprising the steps of detecting with a sensor sounds emitted during the step of irradiating, converting the detected sounds into a sound signal, and stopping the laser light irradiation and roller rotation when the sound signal becomes lower than a predetermined level.

4. A method according to claim 2, wherein said step of irradiating uses multiple laser light sources.

5. A method of removing a part of an organic film from a surface of a roller according claim 4, further comprising the steps of detecting with a sensor sounds emitted during the step of irradiating, converting the detected sounds into a sound signal, and stopping the laser light irradiation and roller rotation when the sound signal becomes lower than a predetermined level.

6. A method of removing a part of an organic film from a surface of a roller according to claim 4, further comprising the steps of making an image of a roller surface with a CCD camera during the step of irradiating, processing the image to obtain a brightness signal, and stopping the laser light irradiation and roller rotation when the brightness signal has a predetermined value.

7. A method of removing a part of an organic film from a surface of a roller according to claim 4, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

8. A method of removing a part of an organic film from a surface of a roller according to claim 2, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

9. A method according to claim 1, wherein said roller is selected from the group consisting of photosensitive drums, fixing rollers, rubber rollers, and magnetic rollers used in photocopying equipment, printers, facsimile machines, and other equipment.

10. A method according to claim 9, wherein the high-intensity pulsed laser light used to irradiate a roller is of a wavelength of 9.3.

11. A method of removing a part of an organic film from a surface of a roller according claim 10, further comprising the steps of detecting with a sensor sounds emitted during the step of irradiating, converting the detected sounds into a sound signal, and stopping the laser light irradiation and roller rotation when the sound signal becomes lower than a predetermined level.

12. A method according to claim 10, wherein said step of irradiating uses multiple laser light sources.

13. A method of removing a part of an organic film from a surface of a roller according to claim 12, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

14. A method of removing a part of an organic film from a surface of a roller according to claim 12, further comprising the steps of making an image of a roller surface with a CCD camera during the step of irradiating, processing the image to obtain a brightness signal, and stopping the laser light irradiation and roller rotation when the brightness signal has a predetermined value.

15. A method of removing a part of an organic film from a surface of a roller according claim 12, further comprising the steps of detecting with a sensor sounds emitted during the step of irradiating, converting the detected sounds into a sound signal, and stopping the laser light irradiation and roller rotation when the sound signal becomes lower than a predetermined level.

16. A method of removing a part of an organic film from a surface of a roller according to claim 10, further comprising the steps of making an image of a roller surface with a CCD camera during the step of irradiating, processing the image to obtain a brightness signal, and stopping the laser light irradiation and roller rotation when the brightness signal has a predetermined value.

17. A method of removing a part of an organic film from a surface of a roller according to claim 10, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

18. A method according to claim 9, wherein said step of irradiating uses multiple laser light sources.

19. A method of removing a part of an organic film from a surface of a roller according claim 18, further comprising the steps of detecting with a sensor sounds emitted during the step of irradiating, converting the detected sounds into a sound signal, and stopping the laser light irradiation and roller rotation when the sound signal becomes lower than a predetermined level.

20. A method of removing a part of an organic film from a surface of a roller according to claim 18, further comprising the steps of making an image of a roller surface with a CCD camera during the step of irradiating, processing the image to obtain a brightness signal, and stopping the laser light irradiation and roller rotation when the brightness signal has a predetermined value.

21. A method of removing a part of an organic film from a surface of a roller according to claim 18, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

22. A method of removing a part of an organic film from a surface of a roller according claim 9, further comprising the steps of detecting with a sensor sounds emitted during the step of irradiating, converting the detected sounds into a sound signal, and stopping the laser light irradiation and roller rotation when the sound signal becomes lower than a predetermined level.

23. A method of removing a part of an organic film from a surface of a roller according to claim 9, further comprising the steps of making an image of a roller surface with a CCD camera during the step of irradiating, processing the image to obtain a brightness signal, and stopping the laser light irradiation and roller rotation when the brightness signal has a predetermined value.

24. A method of removing a part of an organic film from a surface of a roller according to claim 9, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

25. A method according to claim 1, wherein said step of irradiating uses multiple laser light sources.

26. A method of removing a part of an organic film from a surface of a roller according claim 25, further comprising the steps of detecting with a sensor sounds emitted during the step of irradiating, converting the detected sounds into a sound signal, and stopping the laser light irradiation and roller rotation when the sound signal becomes lower than a predetermined level.

27. A method of removing a part of an organic film from a surface of a roller according to claim 25, further comprising the steps of making an image of a roller surface with a CCD camera during the step of irradiating, processing the image to obtain a brightness signal, and stopping the laser light irradiation and roller rotation when the brightness signal has a predetermined value.

28. A method of removing a part of an organic film from a surface of a roller according to claim 25, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

29. A method of removing a part of an organic film from a surface of a roller according to claim 1, further comprising the steps of detecting with a sensor sounds emitted during the step of irradiating, converting the detected sounds into a sound signal, and stopping the laser light irradiation and roller rotation when the sound signal becomes lower than a predetermined level.

30. A method of removing a part of an organic film from a surface of a roller according to claim 1, further comprising the steps of making an image of a roller surface with a CCD camera during the step of irradiating, processing the image to obtain a brightness signal, and stopping the laser light irradiation and roller rotation when the brightness signal has a predetermined value.

31. A method of removing a part of an organic film from a surface of a roller according to claim 2, further comprising the steps of making an image of a roller surface with a CCD camera during the step of irradiating, processing the image to obtain a brightness signal, and stopping the laser light irradiation and roller rotation when the brightness signal has a predetermined value.

32. A method of removing a part of an organic film from a surface of a roller according to claim 1, further comprising the steps of detecting with a sensor sounds emitted during the step of irradiating, converting the detected sounds into a sound signal, making an image of a roller surface with a CCD camera during the step of irradiating, processing the image to obtain a brightness signal, and stopping the laser light irradiation and roller rotation when the sound signal becomes lower than a predetermined level and when the brightness signal has a predetermined value.

33. Equipment for roller machining and processing, comprising:

a roller holding and rotating mechanism;

a laser oscillator for generating and emitting a high intensity pulsed laser light beam;

a laser light irradiation mechanism constructed to irradiate a portion of a surface of a roller held in the roller holding and rotating mechanism with light emitted from said laser oscillator, including at least one full mirror and at least one half mirror arranged to divide the laser light beam into a plurality of sections, a plurality of concave lenses arranged to broaden each of said light beam sections to produce a broadened section; a cylindrical lens arranged to shape each broadened section to produce a rectangular shaped beam; and a mechanism which removes soot, film residue or other material generated during laser irradiation.

34. An equipment for roller machining and processing according to claim 33, further comprising a sensor which detects sounds emitted when the roller is irradiated with the laser and converts the detected sounds into a sound signal; and a controller which sends out stop signals to stop laser light irradiation and roller rotation when the sound signal becomes lower than a predetermined value.

35. An equipment for roller machining and processing according to claim 33, further comprising a CCD camera which makes an image of a surface of the roller when the roller is irradiated with the laser; a computer which processes the image made by the CCD camera and converts the image to a brightness signal; and a controller which sends out stop signals to stop laser light irradiation and roller rotation when the brightness signal reaches a predetermined value.

36. An equipment for roller machining and processing according to claim 33, further comprising a sensor which detects sounds emitted when the roller is irradiated with the laser and converts the detected sounds into a sound signal, a CCD camera which makes an image of a surface of the roller when the roller is irradiated with the laser; a computer which processes the image made by the CCD camera and converts the image to a brightness signal; and a controller which sends out stop signals to stop laser light irradiation and roller rotation when the sound signal becomes lower than a predetermined value and when the brightness signal reaches a predetermined value.

* * * * *